(No Model.)
W. H. HOWLAND.
MACHINE FOR GRINDING AND PULVERIZING ORES.
No. 281,511. Patented July 17, 1883.
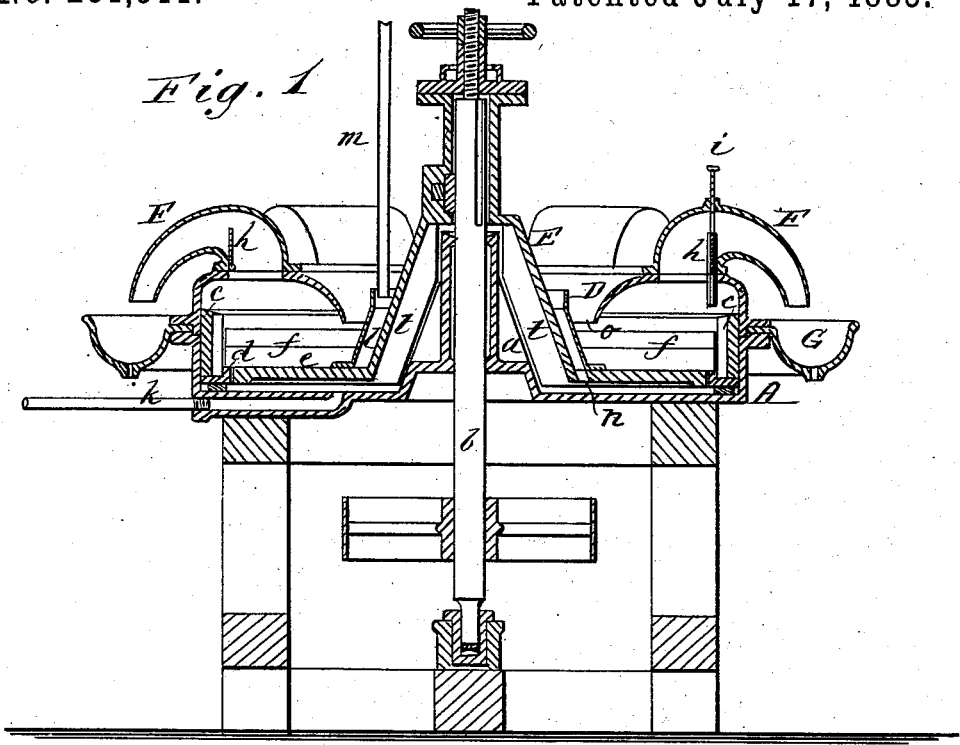
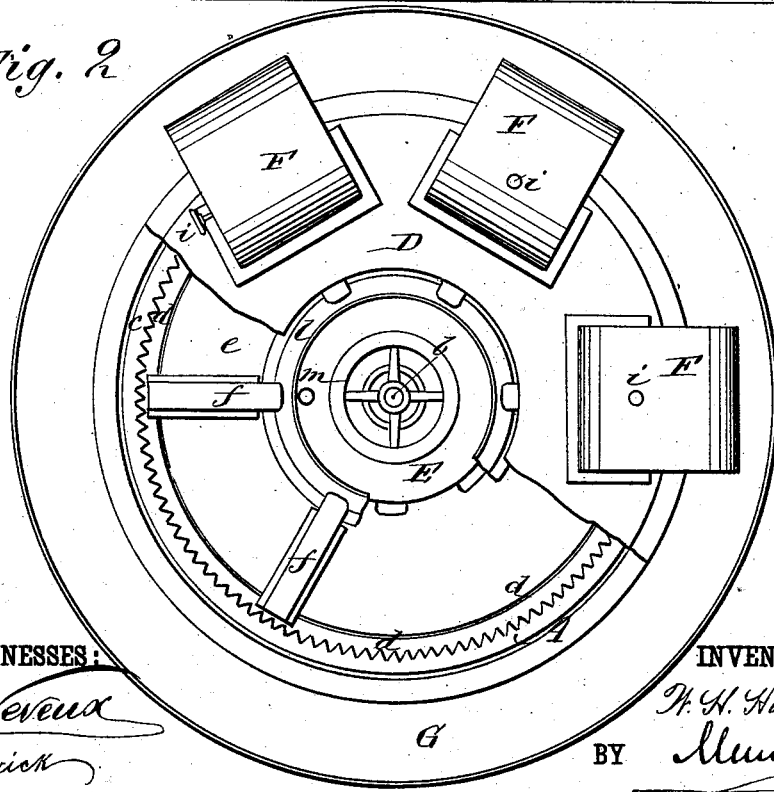
WITNESSES:
C. Neveux
C. Sedgwick
INVENTOR:
W. H. Howland
BY Munn & Co
ATTORNEYS.

UNITED STATES PATENT OFFICE.

WILLIAM H. HOWLAND, OF SAN FRANCISCO, CALIFORNIA.

MACHINE FOR GRINDING AND PULVERIZING ORES.

SPECIFICATION forming part of Letters Patent No. 281,511, dated July 17, 1883.

Application filed October 26, 1882. (No model.)

*To all whom it may concern:*

Be it known that I, WILLIAM H. HOWLAND, of San Francisco, in the county of San Francisco and State of California, have invented new and useful Improvements in Machines for Grinding and Pulverizing Ores, of which the following is a full, clear, and exact description.

My improvements relate to machines for grinding and pulverizing ores and other materials, either wet or dry.

The invention consists in certain novel features of construction of the grinding-mill, as hereinafter described and claimed.

Reference is to be had to the accompanying drawings, forming part of this specification, in which similar letters of reference indicate corresponding parts in all the figures.

Figure 1 is a vertical transverse section of an ore-grinding machine with my improvements. Fig. 2 is a plan view of the same with the bonnet partially broken away. Fig. 3 is a cross-section of one of the arms on the flange of the driver.

A is a fan-shaped casting supported on a suitable frame, and formed at its center with a hub, $a$, for support of the driving-shaft $b$. At the inside of the pan is fitted a ring, $c$, which, as shown most clearly in Fig. 2, is formed with a toothed or serrated surface, and rests upon a bottom ring, $d$, that is supported a short distance above the bottom of the pan.

E is the driver, made with a cone-shaped sleeve keyed to the upper end of the shaft $b$, and formed at its lower end with a horizontal flange, $e$, that extends to the inner edge of the bottom ring, $d$.

To the driver E are fixed arms $f$, these arms being preferably made of T form in cross-section, and also with bottom flanges, similar to railroad-rails, and their outer ends extend nearly in contact with the serrated surface of the ring $c$.

To the edge of the pan A is attached a bonnet, D, the inner edge of which is curved downward, so as to inclose the pan, and upon the upper side of the bonnet D are discharge-chutes F, the outer ends of which curve downward and over a spout, G, fixed to the edge of the pan for receiving the ore. The discharge-chutes F are formed tapering, so that their outer or discharge ends are considerably smaller than the openings at the top of the bonnet, and they are fitted with slides or dams $h\,h$, that can be raised and lowered from the outside, so as to decrease the outlet-space and raise the water-level above the bottoms of the chutes when required. These dams may be hinged, so as to be turned up and down; or they may be fitted to slide vertically, both forms being shown, and handles $i\,i$ are arranged for their operation from the outside of the chutes. Beneath the bottom of the pan is a pipe, $k$, for supply of steam to the pan through the space beneath the flange $e$ of the driver, and around the conical sleeve or driver is fixed a flange, $l$, so as to form a space between the driver and flange, and to this space a pipe, $m$, communicates for supplying water, which will pass through holes $n$ in flange $e$ to the space beneath the flange, where it will meet the steam, and then pass upward between the flange $e$ and ring $d$.

In the operation of the machine, the ore being supplied through the aperture $o$ at the center of the bonnet and the driver rotated, the ore is thrown out by the centrifugal action and carried around by the arms $f$. This combined action upon the ore has the effect to cause the particles to grind one upon the other and against the serrated surface of the ring $c$, thus thoroughly grinding and pulverizing the ore. Water being at the same time supplied by the pipe $m$ fills the pan up to the bottom line of the chutes F, or the top of the dams $h$, in case they are raised, and the fine pulverized ore is carried off with the water flowing out through the chutes. By raising the dams $h$ the water-level will be raised, and in that manner the fineness of the pulverization regulated, for the reason that, the depth of water being increased by the raising of the dams, only the finest particles will be carried off. In grinding rebellious ores, steam is admitted by pipe $k$ for heating the water, and thus facilitating the grinding.

For dry pulverization the driver E is provided with wings $t$, which act to create a blast that forces the fine particles out by chutes F. These wings may be placed on the under side of flange $e$ also.

Having thus described my invention, what I claim as new, and desire to secure by Letters Patent, is—

1. The combination of the revolving grinder E, provided with fixed arms $f$, the ring $c$, and bottom ring, $d$, with the pan A, substantially as described, for operation as set forth.

2. In a machine for grinding and pulverizing ores, the combination, with the pan A and the serrated grinding-ring $c$, of the driver E, provided with the flange $e$ and the arms $f$, T-shaped in cross-section and secured to the upper face of the said flange, substantially as herein shown and described.

3. The combination of the driver E, provided with the flange $l$ and water-supply pipe $m$, with the pan A, grinding-ring $c$, and revolving grinder E, all constructed and arranged substantially as shown and described.

4. In a machine for grinding and pulverizing, the combination, with the pan A, of the bonnet D, having the central aperture, $o$, and provided with the discharge-chutes F, substantially as herein shown and described.

5. In a machine for grinding and pulverizing ores, the combination, with the pan A and the bonnet D, provided with the chutes F, of adjustable dams, substantially as herein shown and described, and for the purpose set forth.

WILLIAM H. HOWLAND.

Witnesses:
  GEO. D. WALKER,
  C. SEDGWICK.